(12) United States Patent
Büth et al.

(10) Patent No.: US 8,870,667 B2
(45) Date of Patent: Oct. 28, 2014

(54) TELESCOPIC SHAFT WITH CONNECTION ELEMENT

(71) Applicant: GKN Walterscheid GmbH, Lohmar (DE)

(72) Inventors: Patrick Büth, Much (DE); Thomas Beitzen, Siegburg (DE)

(73) Assignee: GKN Walterscheid GmbH, Lohmar (DE)

( * ) Notice: Subject to any disclaimer, the term of this patent is extended or adjusted under 35 U.S.C. 154(b) by 0 days.

(21) Appl. No.: 13/670,724

(22) Filed: Nov. 7, 2012

(65) Prior Publication Data

US 2013/0116057 A1    May 9, 2013

(30) Foreign Application Priority Data

Nov. 9, 2011  (DE) .......................... 10 2011 055 169

(51) Int. Cl.
*F16C 3/03* (2006.01)
*F16D 3/06* (2006.01)

(52) U.S. Cl.
CPC .... *F16C 3/03* (2013.01); *F16D 3/06* (2013.01)
USPC ........................................................ 464/162

(58) Field of Classification Search
CPC ............ F16D 3/06; B25G 1/04; B60K 17/22; B62D 1/184
USPC ................ 464/162, 169; 403/109.6; 180/384; 74/493
See application file for complete search history.

(56) References Cited

U.S. PATENT DOCUMENTS

| 73,914 | A | * | 1/1868 | Moul ............................ 464/162 |
| 768,186 | A | * | 8/1904 | Lachmann ................ 464/162 X |
| 1,278,459 | A | * | 9/1918 | Hale .......................... 464/162 X |
| 1,791,001 | A | * | 2/1931 | Rasmussen ..................... 74/493 |
| 2,385,608 | A | * | 9/1945 | Castagna ................... 403/109.6 |
| 4,595,383 | A |   | 6/1986 | Nienhaus |
| 2006/0094516 | A1 |   | 5/2006 | Lukac |

FOREIGN PATENT DOCUMENTS

| DE | 33 34 709 | 4/1985 |
| DE | 697 03 315 | 5/2001 |
| JP | 2007-247846 | 9/2007 |

* cited by examiner

*Primary Examiner* — Gregory Binda
(74) *Attorney, Agent, or Firm* — Harness, Dickey & Pierce, P.L.C.

(57) ABSTRACT

A torque transmitting telescopic shaft (1) has an inner profile tube (2), an intermediate profile tube (3) and an outer profile tube 4. The tubes (2, 3, 4) are displaceably arranged with respect to each other for length adjustment. A connection element (5), with at least one axial elongated hole (6), is axially non-displaceably held in the intermediate profile tube (3). An engagement mechanism (7) connects with the inner profile tube (2). The engagement mechanism (7) engages the at least one axial elongated hole (6) of the connection element (5) to limit a displacement path between the inner profile tube (2) and the connection element (5).

11 Claims, 4 Drawing Sheets

TELESCOPIC SHAFT WITH CONNECTION ELEMENT

CROSS-REFERENCE TO RELATED APPLICATION

This application claims priority to German Patent Application No. 102011055169.7 filed Nov. 9, 2011. The entire disclosure of the above application is incorporated herein by reference.

FIELD

The disclosure relates to a telescopic shaft for transmitting torque, comprising an inner profile tube, an intermediate profile tube and an outer profile tube. The tubes are displaceably arranged with respect to one another for length adjustment. A connection element is axially non-displaceably held in the intermediate profile tube.

BACKGROUND

Multi-part telescopic shafts are known from the State of the Art. They have three profile tubes for length-adjustment of the telescopic shaft. The profile tubes are formed such that they have a cross-section that deviates from a circle in order to transmit torque from one profile tube to another profile tube. The profile tubes can have a cross-section in the form of a star or a lemon. In these well-known telescopic shafts the problem arises, how, during the pulling-out of the inner profile tube relative to the intermediate profile tube, the intermediate profile tube can be jointly moved after the inner profile tube has been pulled out by a certain amount relative thereto, to be pulled out relative to the outer profile tube. For this, a pulling wire can be used. The wire is attached at one end on an axial end of the inner profile tube. It is guided therethrough and is attached at its other end at an axial end of the intermediate profile tube. In the retracted condition of the telescopic shaft, the pulling wire lies loosely in the inner profile tube. The wires length is larger than the axial distance of the attachments on the respective profile tubes. Thus, the inner profile tube can be pulled out by a certain amount relative to the intermediate profile tube, before the pulling wire is pulled tight and pulls the intermediate profile tube along. The problem with this coupling is the lack of robustness of the pulling wire. The wire does not withstand the arising loadings after a certain time of use.

DE 33 34 709 C2 illustrates a telescopic shaft with an outer and an inner profile tube. Within the two profile tubes, an inner tie bolt and an outer tie bolt are arranged. The inner and outer tie bolts, respectively, are detachably connected via locking members to one of the profile tubes. The inner tie bolt has diametrically opposed longitudinal slots. A catcher is guided in the slots and is connected to the tie bolt. The catcher passes through the longitudinal slots, when the telescopic shaft is extended in length. A further pulling-out is possible such that the locking members move between the tie bolts and the respective profile tube in the extended locking position. In the extended condition the telescopic shaft cannot transmit a torque.

SUMMARY

It is an object of the present disclosure to provide a telescopic shaft that can transmit a torque in the extended position. Additionally, the coupling of the profile tubes is robust in view of the occurring loads.

The object is solved by a torque transmitting telescopic shaft that comprises an inner profile tube, an intermediate profile tube and an outer profile tube. The tubes are displaceably arranged with respect to each other for length adjustment. A connection element, with at least one axial elongated hole, is axially non-displaceably held in the intermediate profile tube. An engagement mechanism is connected to the inner profile tube. The engagement mechanism engages the at least one axial elongated hole of the connection element to limit a displacement path between the inner profile tube and the connection element.

An advantage of this embodiment is that a robust and loadable connection is achieved between the inner and the intermediate profile tube. This is accomplished by the attachment of the connection element, at its one side, on the intermediate profile tube and by the engagement of the engagement mechanism of the inner profile tube in the elongated hole of the connection element. A further advantage is that the manufacturing of an elongated hole is easy. Additionally, the connection element is not weakened to a great extent with respect to the critical pulling and extraction loads. Furthermore, for manufacturing the connection element, a wide variety of available standardized products or bulk stock can be used.

Preferably, the connection element comprises a tube with circular cross-section. A low weight of the connection element, compared to a solid cross-section, is thus ensured. A circular cross-section is advantageous since no accurate fitting adaptation to the profile tube with special cross-section has to be carried out.

In one embodiment of the tubular connection element, two axial elongated holes are arranged opposite to each other. Advantageously, this provides for rotational symmetry of the connection element. Preferably, the engagement mechanism diametrically engages through the axial elongated holes. Thus, in an advantageous manner, the engagement mechanism ensures connection at both axial sides of this engagement through the connection element to the inner profile tube or it can be attached thereto.

The connection element may include a tube or it is made from a tube. At least one elongated hole is worked into the tube wall. Alternatively, the connection element can include two connection rods, axially aligned and arranged parallel to each other. The rods can be formed from flat steel and connected to each other at their axial ends, via end pieces. The end pieces each form a tube portion. In this case, the end pieces can be formed tubular. The end pieces are connected to the ends of the connection rods and/or can be formed bowl-like, to form together with the connection rods a tubular portion.

The engagement mechanism includes a first locking pin. In a further embodiment, the connection element is held via a second locking pin relative to the intermediate profile tube. Thus, advantageously, a wide variety of available standardized parts can be used for the engagement mechanism.

More specifically, the second locking pin rests in locking pin bores, respectively, on the intermediate profile tube or of the connection element. Such a connection is simple to provide during manufacturing.

The inner profile tube displaceably rests between the connection element and the intermediate profile tube. It is an advantage, according to this arrangement, that the connection element can be retrofitted without larger expenditure in existing multi-part telescopic shafts.

In a further embodiment, a first radial axis of the locking pin bore extends at an angle in the connection element. The bore diverts from a right angle to an axial plane. The axial plane is formed by the at least one axial elongated hole and a longitudinal axis of the telescopic shaft. A second radial axis of the locking pin bore extends at an angle in the intermediate profile tube. The bore diverts from a right angle to an axial plane. The axial plane is formed by the at least one axial elongated hole and a longitudinal axis of the telescopic shaft. It is preferable if the first and the second radial axes of the locking pin bores are arranged on each other.

The object is further met by a universal joint shaft with a telescopic shaft with a first joint non-rotationally connected to the inner profile tube and a second joint non-rotationally connected to the outer profile tube.

Further areas of applicability will become apparent from the description provided herein. The description and specific examples in this summary are intended for purposes of illustration only and are not intended to limit the scope of the present disclosure.

DRAWINGS

In the following the telescopic shaft according to the disclosure is described by using the figures. It shows:

FIG. 1b is a cross-sectional view along the intersection of line I-I of FIG. 1a;

FIG. 1c is a cross-sectional view along the section line II-II of FIG. 1a.

FIG. 1d is a cross-sectional view along the section line III-III of FIG. 1a.

FIG. 2 is a connection element of the telescopic shaft according to FIG. 1a.

DETAILED DESCRIPTION

Figure 1A:
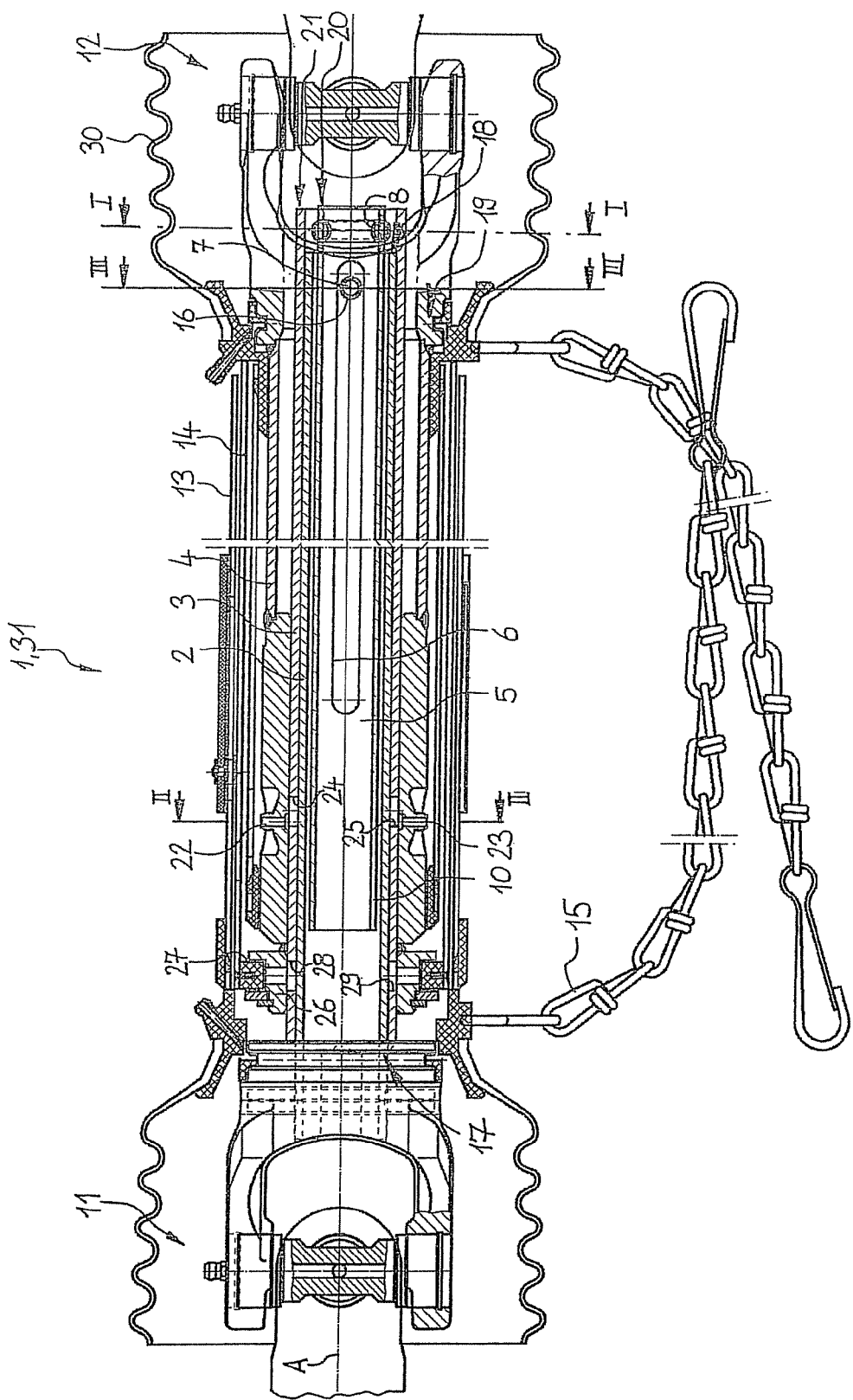
FIG. 1a is a longitudinal sectional view of a telescopic shaft rotated 90° out of phase to better illustrate a first locking pin in the axial elongated holes according to the disclosure.

Example embodiments will now be described more fully with reference to the accompanying drawings.

In FIG. 1, a universal joint shaft 31 is shown in the fully retracted condition with universal joints 11, 12 and an extendable telescopic shaft 1 with three parts. The telescopic shaft 1 includes an inner profile tube 2, an outer profile tube 4 and an intermediate profile tube 3. The inner profile tube 2 is non-rotationally connected at its one axial end 17 to the first universal joint 11. The outer profile tube 4 is non-rotationally connected at its one axial end 19 to the second universal joint 12. The tubes 2, 3, 4 are telescopically inserted into one another. The intermediate profile tube 3 is arranged between the inner profile tube 2 and the outer profile tube 4.

The rotating universal joint shaft 31 is provided with an outer protective tube 13 and an inner protective tube 14. For length adjustment purposes, the tubes 13, 14 are both telescopically inserted into one another. Each protective tube 13, 14 is attached in the area of the respective universal joint 11, 12 to the outer or inner protective tube 4, 2. The protective tubes 13, 14 are secured against rotating by chains 15.

A connection element in the form of a connection rod 5 is arranged within the inner profile tube 2. The connection rod 5 is comprised of a tube 10. The connection rod 5 projects axially beyond the axial end 18 of the inner profile tube 2 that faces away from the universal joint 11 attached to the inner profile tube 2. In this projecting area, the connection rod 5 is held by a second locking pin 8 at the intermediate profile tube 3. The second locking pin 8 rests in the locking pin bores 9, 9' of the intermediate profile tube 3 and the connection rod 5, as visible in FIG. 1b. The locking pin bores 9 have a distance of approximately 10 mm from the axial end 21 of the intermediate profile tube 3. The locking pin bores 9' have a distance of approximately 10 mm from the axial end 20 of the connection rod 5.

Figure 1B:
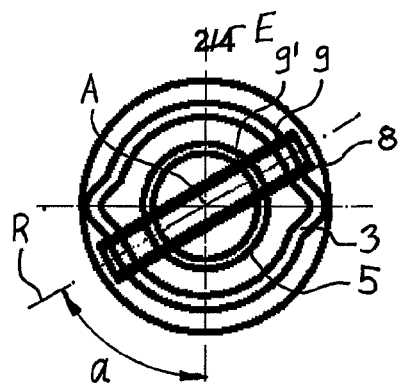
Figure 1C:
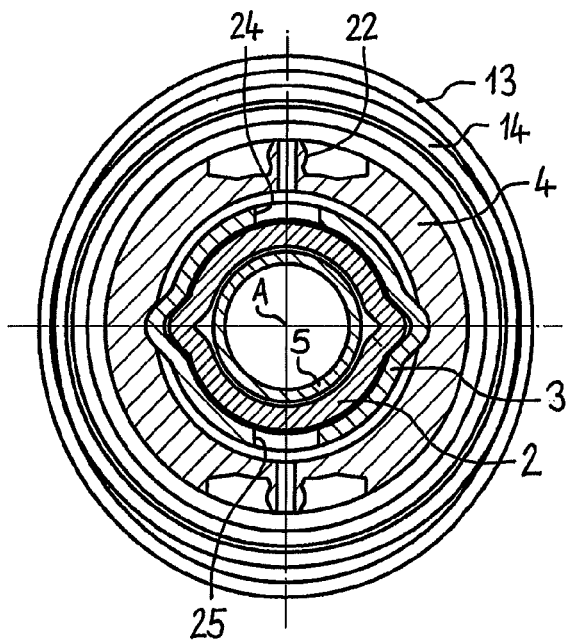
Figure 1D:
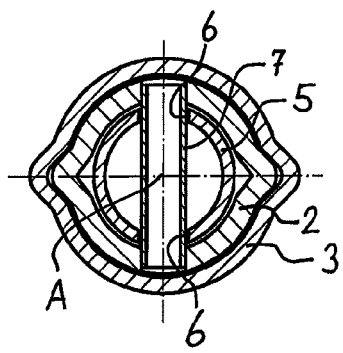

In FIG. 1b, it is visible that the second locking pin 8 rests relative to an axial plane E at an angle α of 60° in the intermediate profile tube 3 and the connection rod 5 in the locking pin bores 9, 9'. Different angles a can also be provided. Furthermore, the cross-sectional shape of the intermediate profile tube 3 is visible. The intermediate tube 3 is correspondingly provided in the inner profile tube 2 and the outer profile tube 4 via a form-fitting engagement to enable a torque transmission. The connection rod 5 has a circular cross-section.

The connection rod 5 has two diametrically opposed axial elongated holes 6, 6'. Only the elongated hole 6 is visible in FOG. 1a. The axial elongated holes 6, 6' have a distance of approximately 25 mm from the axial end 20 of the connection rod 5. An engagement mechanism, in the form of a first locking pin 7, engages through the two axial elongated holes 6, 6'. The first locking pin 7 is held in locking pin bores 16 of the inner profile tube 2. The locking pin bores 16 have a distance of approximately 15 mm from the axial end 18 of the inner profile tube 2. In the representation of FIG. 1b it has to be considered, that the connection rod 5 with the axial elongated hole 6, 6' and the first locking pin 7 are shown rotated by 90° relative to the remaining representation. In reality, the radial axis of the first locking pin extends in the drawing plane compared to the second locking pin 8. According, it is not angled to the axial plane E, which is shown in FIG. 1b.

During extension movement of the telescopic shaft 1, the inner profile tube 2 is first pulled out relative to the intermediate profile tube 3 and to the connection rod 5, connected to the intermediate profile tube 3. In this case, the first locking pin 7, which is connected to the inner profile tube 2, runs along the axial elongated holes 6, 6' of the connection rod 5. As the moment continues, the first locking pin 7 runs along the axial elongated holes until it abuts the end of the connecting rod. A form-fitting connection exists between the inner profile tube 2 and the intermediate profile tube 3 in the direction of extension. Thus, a further extension movement of the telescopic shaft 1 is carried out via a pulling out of the intermediate profile tube 3 relative to the outer profile tube 4. Due to the engagement of the first locking pin 7, which is connected to the inner profile tube 2 in the axial elongated holes 6, 6' of the connection rod 5, the displacement path between the inner profile tube 2 and the connection rod 5 is limited. The retraction of the telescopic shaft 1 is achieved, in the reversed sequence or alternatively such, that initially the inner profile tube 2 retracts relative to the connection rod 5. The first locking pin 7 runs along the axial elongated holes 6, 6', and then the intermediate profile tube 3 is moved by the connection rod 5 and retracted by it into the outer profile tube 4.

Lubrication of the protection bearing race 27, of the outer protective tube 24, on the bearing ring 26 of the intermediate profile tube 3 is achieved via lubricating nipples 22, 23, bores 24, 25 and bores 28, 29 in the axial plane of the bearing ring 24 in the intermediate profile tube 3.

For mounting the second locking pin 8, a not shown bore is provided on the circumference of the boot 30 of the protective tube 14.

A connection rod 5 according to the disclosure forms a form-fitting connection between the inner profile tube 2 and the intermediate profile tube 3. Thus, it provides a robust pulling-out mechanism for a universal joint shaft 31 with a multipart telescopic shaft 1.

Figure 2:
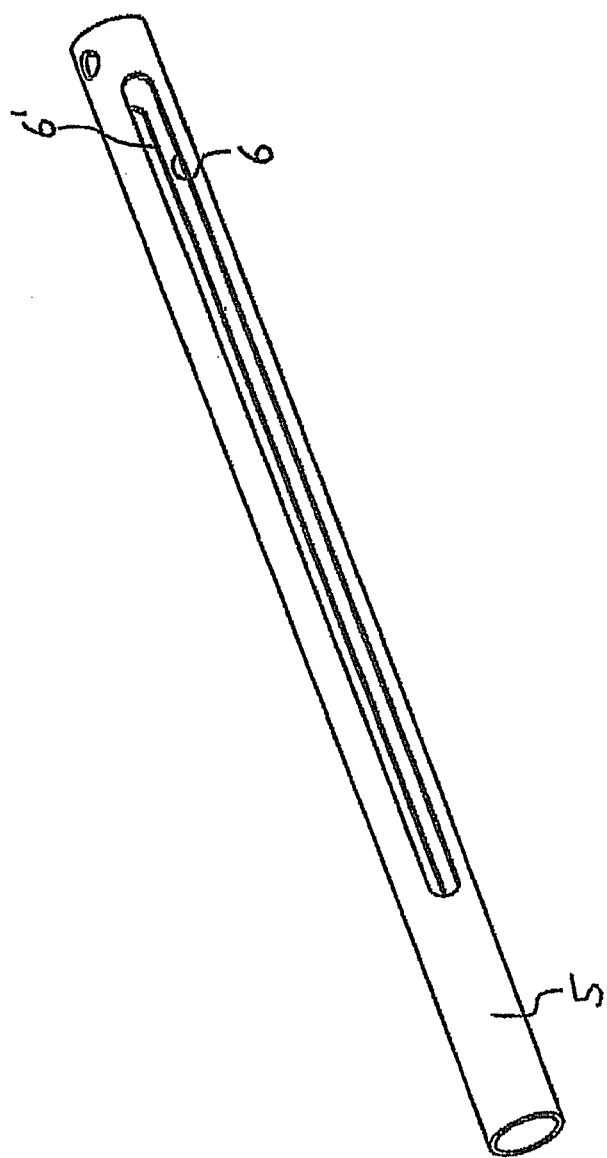
Figure 3:
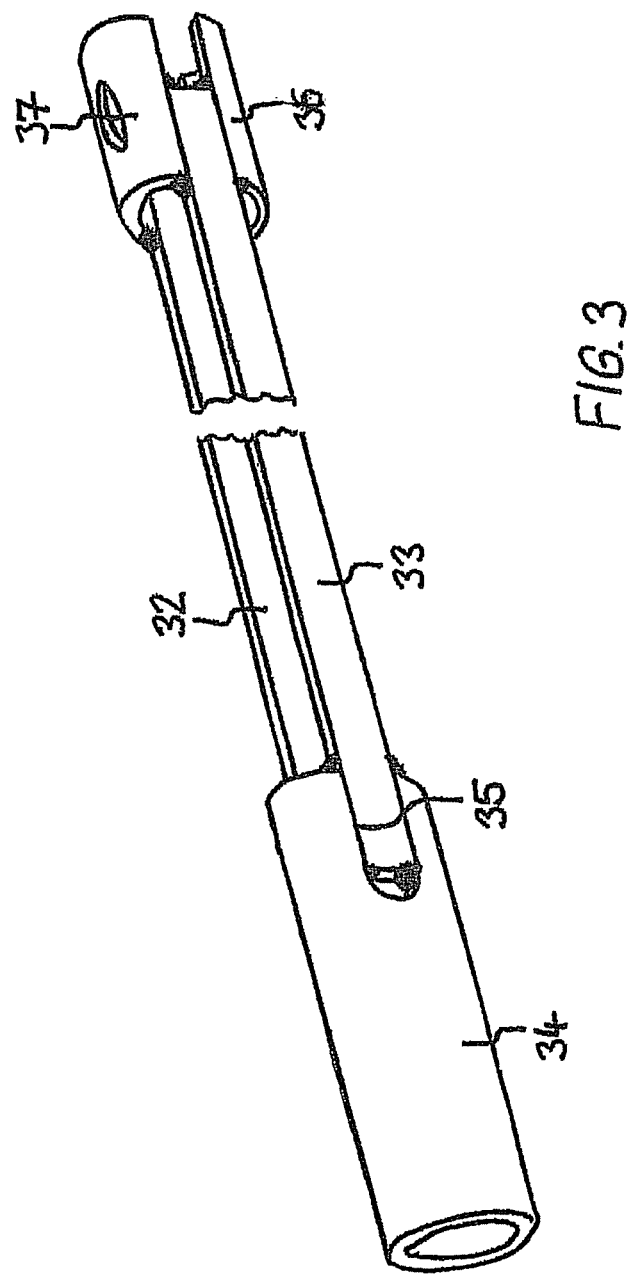
FIG. 3 is an alternative connection element.

FIG. 2 shows an exemplary view of a connection element 5 with the two axial elongated holes 6, 6'. Alternatively, the connection element 5 can be constructed as in FIG. 3. Here it is not made from a tube with elongated holes worked into the wall. The embodiment of FIG. 3 is a connection element formed as an assembly from two connection rods 32, 33 with a rectangular cross-section that extends parallel to each other forming an elongated opening 6" between them. At one of their ends, the connection rods 32, 33 are welded to a tubular end piece 34. The end piece 34 has at one of its front ends two slots 35. The ends of the connection rods 32, 33 are inserted into the slots 35. The slots 35 extend over a portion of the length of the end piece 34 and pass through the whole wall thickness. Generally, however, grooves are also sufficient in the outer circumferential face of the end piece 34 if the end piece 34 has a thicker wall thickness than the connection rods 32, 33. In the present case, the wall thickness of the end piece 34 is identical to that of the connection rods 32, 33.

Such an end piece can also be provided at the other ends of the connection rods 32, 33. Alternatively, as shown here, two bowl-like end parts 36, 37 are provided. They are connected to the connection rods 32, 33 such that they form, together, a tubular end piece. This type of connection can also be provided at the other end instead of the end piece 34.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A telescopic shaft for transmitting torques, comprising:
an inner profile tube, an intermediate profile tube and an outer profile tube, the inner, intermediate and outer profile tubes are displaceably arranged with respect to each other for length adjustment;
a connection element includes at least one axial elongated opening for coupling with the inner profile tube for transmitting torque, the connection element is axially non-displaceably held inside the intermediate profile tube and coupled with the intermediate profile tube for transmitting torque, and the connection element is axially displaceable inside of the inner profile tube;
an engagement mechanism is connected to the inner profile tube, the engagement mechanism engages the at least one axial elongated opening of the connection element to limit a displacement path between the inner profile tube and the connection element and to transmit torque between the connecting element and inner profile tube, and the outer profile tube is coupled with the intermediate profile tube for torque transmission.

2. The telescopic shaft according to claim 1, wherein two axial elongated openings are arranged opposite to each other.

3. The telescopic shaft according to claim 2, wherein the engagement mechanism diametrically engages through the axial elongated openings.

4. The telescopic shaft according to claim 1, wherein the connection element further comprises a tube having a wall provided with the at least one elongated opening.

5. The telescopic shaft according to claim 1, where the connection element further comprises two connection rods that are axially aligned and arranged parallel to each other with the at least one axial opening between the two connection rods and the connecting rods are connected to each other at their axial ends, with end pieces, forming a tube portion.

6. The telescopic shaft according to claim 1, wherein the engagement mechanism comprise a first locking pin.

7. The telescopic shaft according to claim 1, wherein the connection element is held via a connection locking pin relative to the intermediate profile tube.

8. The telescopic shaft according to claim 7, wherein the connection locking pin rests in locking pin bores, respectively, of the intermediate profile tube and of the connection element.

9. The telescopic shaft according to claim 1, wherein a radial axis of a locking pin bore extends in the connection element at an angle that diverts from a right angle to an axial plane and the axial plane is formed by the at least one axial elongated opening and a longitudinal axis of the telescopic shaft.

10. The telescopic shaft according to claim 1, wherein a radial axis of a locking pin bore extends in the intermediate profile tube at an angle, that diverts from a right angle to an axial plane, the axial plane is formed by the at least one axial elongated opening and a longitudinal axis of the telescopic shaft.

11. The universal joint shaft with a telescopic shaft according to claim 1, wherein a first joint is non-rotationally connected to the inner profile tube and a second joint is non-rotationally connected to the outer profile tube.

\* \* \* \* \*

UNITED STATES PATENT AND TRADEMARK OFFICE
CERTIFICATE OF CORRECTION

PATENT NO. : 8,870,667 B2
APPLICATION NO. : 13/670724
DATED : October 28, 2014
INVENTOR(S) : Patrick Büth et al.

It is certified that error appears in the above-identified patent and that said Letters Patent is hereby corrected as shown below:

In the Specification

Column 4
Line 16       "FOG. 1$a$" should be --FIG. 1$a$--

Signed and Sealed this
Seventh Day of April, 2015

Michelle K. Lee
*Director of the United States Patent and Trademark Office*